United States Patent [19]

Winzeler

[11] 4,357,840

[45] Nov. 9, 1982

[54] MULTI-SPEED PLANETARY DIFFERENTIAL

[75] Inventor: James E. Winzeler, East Peoria, Ill.

[73] Assignee: Caterpillar Tractor Co., Peoria, Ill.

[21] Appl. No.: 196,793

[22] PCT Filed: Mar. 31, 1980

[86] PCT No.: PCT/US80/00347

§ 371 Date: Mar. 31, 1980

§ 102(e) Date: Mar. 31, 1980

[87] PCT Pub. No.: WO81/02921

PCT Pub. Date: Oct. 15, 1981

[51] Int. Cl.[3] .................. F16H 37/08; F16H 1/42; F16H 57/10
[52] U.S. Cl. ..................... 74/682; 74/705; 74/710; 74/714; 74/758; 74/760; 74/762; 74/764
[58] Field of Search ............. 74/758, 759, 764, 765, 74/760, 761, 762, 763, 710, 710.5, 714, 682, 705

[56] References Cited

U.S. PATENT DOCUMENTS

| | | | |
|---|---|---|---|
| B 500,945 | 2/1976 | Winzler | 74/764 |
| 2,164,729 | 7/1939 | Wilson | 74/760 X |
| 2,377,354 | 6/1945 | Merritt | 74/705 X |
| 2,560,216 | 7/1951 | Coponat | 74/682 |
| 2,648,236 | 8/1953 | Wilson | 74/714 |
| 2,689,488 | 9/1954 | Storer, Jr. et al. | 74/710.5 |
| 2,950,634 | 8/1960 | Clark et al. | 74/682 X |
| 2,969,695 | 1/1961 | Christenson et al. | 74/710.5 |
| 3,039,327 | 6/1962 | Breting | 74/764 X |
| 3,107,554 | 10/1963 | Polak et al. | 74/710.5 X |
| 3,253,688 | 5/1966 | Livezey | 74/763 X |
| 3,377,885 | 4/1968 | Tuck et al. | 74/705 X |
| 3,383,953 | 5/1968 | Christenson | 74/710.5 |
| 3,392,602 | 7/1968 | Frost | 74/720.5 |
| 3,405,574 | 10/1968 | Livezey | 74/705 X |
| 3,425,296 | 2/1969 | Livezey | 74/720.5 |
| 3,820,418 | 6/1974 | Ott | 74/759 |
| 3,946,623 | 3/1976 | Murakami et al. | 74/765 |
| 4,004,473 | 1/1977 | Pearce et al. | 74/763 X |
| 4,007,648 | 2/1977 | Bookout | 74/763 |

FOREIGN PATENT DOCUMENTS

500054  2/1939  United Kingdom ............... 74/762

*Primary Examiner*—Leslie Braun
*Attorney, Agent, or Firm*—Charles E. Lanchantin, Jr.

[57] ABSTRACT

A compact planetary differential (10) is provided including first and second planetary sets (16,18) individually having ring, sun, and carrier elements (26,28,30,34,36,38), a rotary input member (12), first and second output members (20,22) individually connected to a preselected first one of the elements of the respective planetary sets, and with preselected second ones of the elements of the respective planetary sets being connected for joint rotation. A multi-speed unit (14) desirably always drives the output members at equal torque levels while imparting multi-speed capability thereto. The multi-speed unit is driven by the input member and drives the remaining third one of the elements of the second planetary set in at least one speed. The multi-speed unit (14) preferably includes a third planetary set (44), one brake assembly (54) and a clutch assembly (102), or two brake assemblies (54,56) connected to preselected ones of the ring, sun, and/or carrier elements thereof.

58 Claims, 10 Drawing Figures

MULTI-SPEED PLANETARY DIFFERENTIAL

TECHNICAL FIELD

This invention relates generally to a differential for a vehicle cross drive or the like, and more particularly to a planetary differential incorporating multi-speed capability in a compact and simplified manner.

BACKGROUND ART

While there are a large number of vehicles such as earthmoving tractors and military tanks that have utilized multi-speed cross drive transmissions, the transmissions have incorporated an excessive number of gears and associated elements, and have generally been overly complex and costly in construction. In some cases multiple speeds for the driving ground-engaging members have been achieved by merely duplicating a plurality of planetary sets and operating brakes and clutches on the left and right sides, with such brakes and clutches controlling one or more reaction members independently of the operation on the opposite side of the vehicle.

Another deficiency with prior cross drive mechanisms is that the rotating members thereof have been arranged on a plurality of transverse axes so that the construction was not only costly, but also required an excessively large housing for containment of the components.

Still another deficiency is that such cross drive transmissions have not simultaneously provided a true differential function wherein the driving torques at the opposite sides of the vehicle are continuously equalized. For example, differential steering mechanisms have heretofore been proposed which force one output member to increase in speed while simultaneously forcing the opposite output member to decrease in speed by acting on one element of a pair of oppositely disposed planetary sets. This is achieved by a cross shaft or bevel gear drive connection between such elements and separate from the input drive that interferes with the true differential function and causes unequal torques to be imposed upon the output members. Moreover, hydrostatic drive units have been employed for steering purposes in many of the earlier mechanisms, but the mixture of hydrostatic and mechanical drive unduly complicates the construction and requires an excessive amount of space.

Thus, what is needed is a compact multi-speed differential having a true differential action and a minimum number of components which can preferably be arranged along one transverse axis in a concentric manner. Preferably too, the multi-speed differential should be simple and economical to manufacture, and should incorporate a built-in reduction or speed step down capability so that it can be relatively closely coupled to a driving engine without the need for an additional reduction gear train.

The present invention is directed to overcoming one or more of the problems as set forth above.

DISCLOSURE OF THE INVENTION

In one aspect of the present invention a compact planetary differential is provided including first and second planetary sets individually having ring, sun and carrier elements, a rotary input member, first and second output members individually connected to a preselected first one of the elements of the respective planetary sets, and with preselected second ones of the elements of the respective planetary sets being connected for joint rotation. Desirably, means are provided for driving the output members at equal torque levels while imparting multi-speed capability thereto. Such means is driven by the input member and drives the remaining third one of the elements of the second planetary set in at least one speed.

Advantageously, the means to provide such multi-speed capability can include a multi-speed unit consisting essentially of at least one more planetary set with one brake assembly and a clutch assembly or two brake assemblies connected to preselected ones of the ring, sun and/or carrier elements thereof. It has been found to be particularly desirable, for example, to connect the sun elements of the first and second planetary sets for joint rotation and to connect the output members to the ring or carrier elements of the first and second planetary sets for joint rotation.

The compactness and simplicity of the interconnected planetary sets above described is particularly desirable in the cross drive of a fork lift truck, earthmoving vehicle or the like where space is at a premium. Basically, the planetary differential of the present invention is substantially concentrically aligned along a single axis so that the space and mounting complexities heretofor apparent with prior art multi-axes constructions have been obviated.

In accordance with another aspect of the invention the ring elements of the first and second planetary sets of the instant multi-speed differential can be connected to directly rotate the left and right wheels to not only provide an equal torque or true differential function, but also to provide a speed reduction from the input member without the added necessity of incorporating an intermediate gear train for that purpose.

BEST MODE FOR CARRYING OUT THE INVENTION

Figure 2:
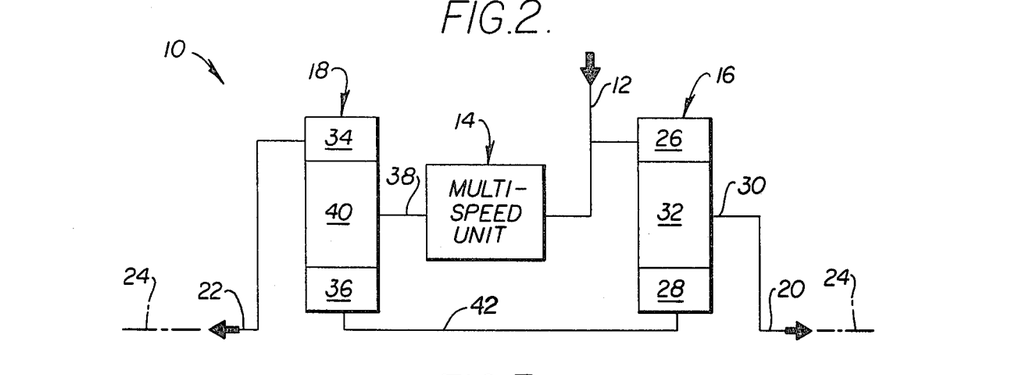
FIG. 2 is a generalized schematic representation of the planetary differential of FIG. 1.

Referring initially to the diagrammatic drawing of FIG. 2, a multi-speed planetary differential 10 is shown in simplified form which has a driven rotary input member or gear 12, a multi-speed unit 14, first and second planetary sets 16 and 18, and first and second output members 20 and 22 that are generally aligned on a vehicle cross drive axis 24 disposed normal to the usual forward and reverse direction of vehicle travel.

The first planetary set 16 includes ring, sun and carrier elements 26, 28 and 30 of the usual type wherein a plurality of similar planet elements 32 are rotatably mounted on the carrier element and are in intermeshing engagement with the ring and sun elements. In the instant example the carrier element 30 is connected to the first or right output member 20. The second planetary set 18 also includes ring, sun and carrier elements 34, 36 and 38, and a plurality of planet elements 40 rotatably mounted in equally spaced peripheral relationship on the carrier element. As is illustrated, the ring element 34 is connected to the second or left output member 22. Advantageously, the input member 12 is connected to the ring element 26 as well as to the multi-speed unit 14 to provide a common rotary drive. The output of the multi-speed unit is connected to the carrier element 38 of the second planetary set 18, and the sun elements 28 and 36 are connected together by a cross shaft 42 to complete the power flow path within the differential 10. Thus, in the broadest aspects of the construction illustrated in FIG. 2 the multi-speed unit 14 can provide two, three, four or even more speed steps and optional reversing capability to the first and second output members 20, 22 in a compact and economical manner, as well as providing a true differential action by continually delivering equal torque to the opposite output members and for accommodating unequal rotational speeds of the output members such as can typically occur with vehicle tires.

Figure 1:
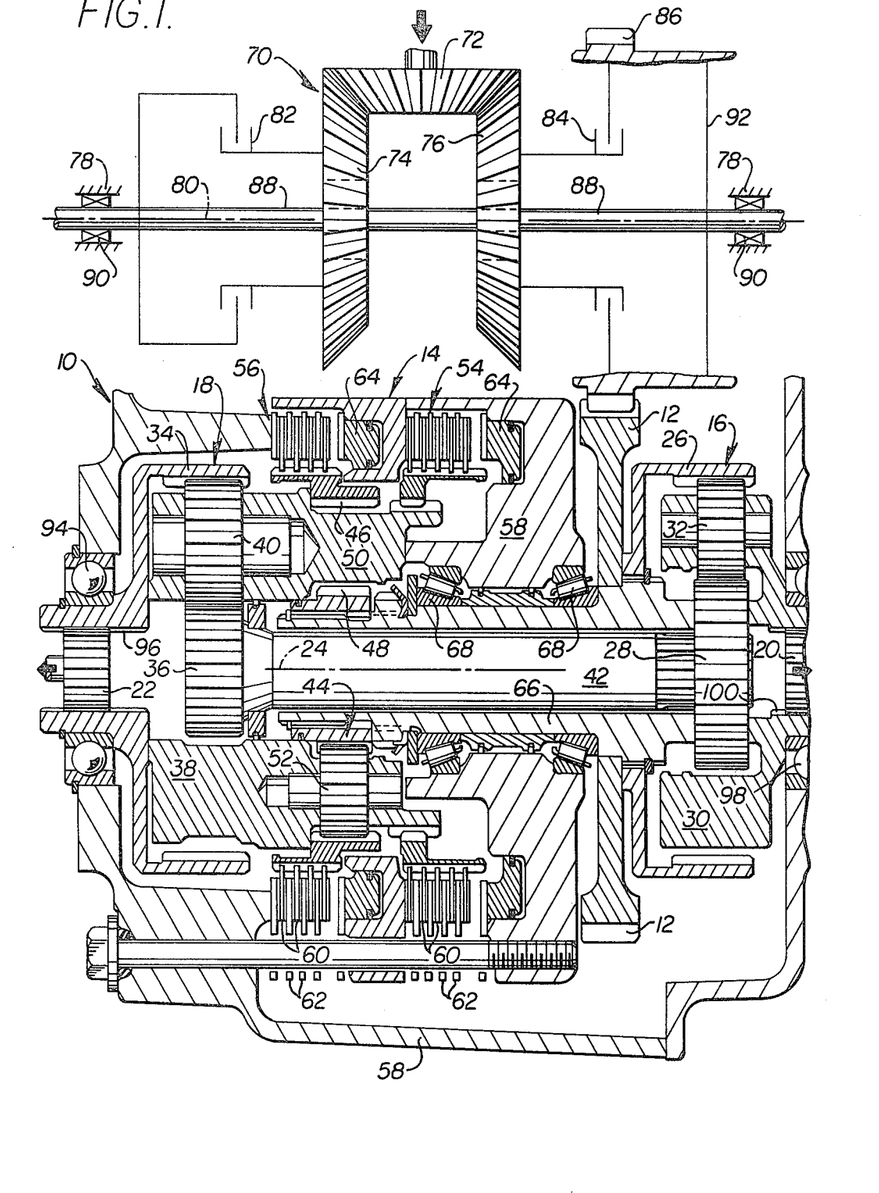
FIG. 1 is a diagrammatic, partial, cross sectional view of one embodiment of the multi-speed planetary differential of the present invention, and including a directional transmission unit schematically associated with the input member thereof.
Figure 3:
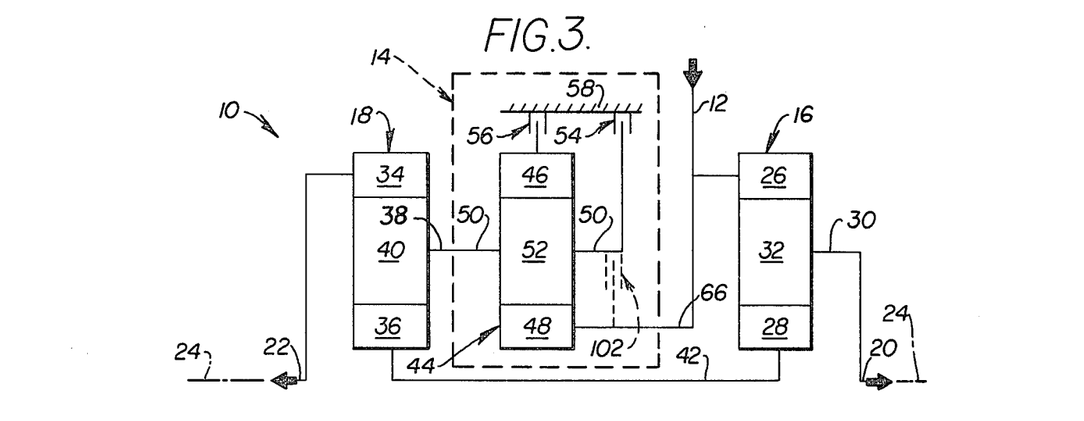
FIG. 3 is a more precise schematic representation of the planetary differential illustrated in FIG. 1, including in phantom lines an optional rotating clutch assembly therefor.

More specifically, and with reference now to FIGS. 1 and 3, one multi-speed unit 14 can be noted to include a third planetary set 44 having ring, sun and carrier elements 46, 48 and 50 and a plurality of planet elements 52 rotatably mounted on the carrier element and in meshing engagement with the ring and sun elements. As can be noted from the instant example, the carrier element 50 and the carrier element 38 of the third and second planetary sets are integral with one another. The multi-speed unit further includes first and second brake assemblies generally designated by the reference numbers 54 and 56 respectively which, when actuated, connect the carrier or ring elements 50 and 46 to a fixed cross drive housing 58. These brake assemblies can be of conventional construction, and are illustrated as having a plurality of interleaved discs and plates 60, 62 which are respectively disposed in non-rotary but axially sliding engagement with the stationary housing and the rotating element. An annular piston 64 associated with each of the brake assemblies is nested in the housing so as to be moved to the left when viewing FIG. 1 by hydraulic fluid appropriately directed thereto for engaging the respective brake assembly. The pistons of the brake assemblies are urged back to the right toward their disengaged positions by coiled compression springs or the like, not shown. In the instant example the engagement of the first brake assembly 54 provides a low speed drive and the engagement of the second brake assembly 56 provides an intermediate speed drive.

A hollow input shaft 66 is rotatably supported within the housing 58 on a pair of opposed tapered bearing assemblies 68 in concentric relationship to the cross shaft 42 and the cross drive axis 24. The input gear 12 and the ring element 26 of the first planetary set 16 are connected to the hollow input shaft 66 at the right end thereof, and the sun element 48 of the third planetary set 44 is connected to the hollow input shaft at the left or opposite end thereof.

Preferably, a forward and reverse directional transmission unit 70 is connected to the input gear 12. This directional unit is adapted to longitudinally receive driving power from a prime mover or engine, not shown, via an input pinion gear 72. The input pinion gear is in intermeshing engagement with left and right annular bevel gears 74 and 76 which are independently and freely rotatably mounted with respect to a fixed housing 78 along a second transverse axis 80. Advantageously, left and right rotating clutch assemblies 82, 84 are operatively associated with these bevel gears to provide reverse and forward speed drive to an output gear 86 connected thereto. Although these clutch assemblies are only diagrammatically illustrated it is to be understood that they can be of conventional construction also, such as by including a plurality of interleaved plates and discs of the general type described earlier with respect to brake assemblies 54 and 56. Particularly, when the forward rotating clutch assembly 84 is engaged, the right bevel gear 76 is directly connected to the output gear 86. On the other hand, when the reverse rotating clutch assembly 82 is engaged the left bevel gear 74 is connected to a central cross shaft 88 which extends freely within the bevel gears. This cross shaft is rotatably supported by the housing 78 via bearings 90 and is connected to the output gear 86 through an interconnecting member 92.

Turning now to the output sides of the multi-speed planetary differential 10, it may be noted that on the left side when viewing FIG. 1 the output ring element 34 is rotatably supported within the housing 58 by a bearing assembly 94. The ring element is splined as at 96 to drivingly receive the left output member 22. On the right side the output carrier element 30 is rotatably supported within the housing by another bearing assembly 98. The carrier element is likewise splined as at 100 to drivingly receive the right output member 20. What is of special note is that all rotating elements of the planetary differential 10 are supported concentrically on the axis 24 by means of only four bearing assemblies, namely, bearing assemblies 68, 68, 94 and 98.

As shown in phantom lines centrally of FIG. 3, the multi-speed planetary differential 10 can optionally include a direct drive in the multi-speed unit 14 by the addition of a rotating clutch assembly 102. In effect, when actuated, the rotating clutch assembly 102 connects the sun element 48 or the hollow input shaft 66 to the carrier element 50 for joint rotation so that the third planetary set rotates as a unit to provide a relatively high speed output drive to the opposite output members 20,22.

Figure 4:
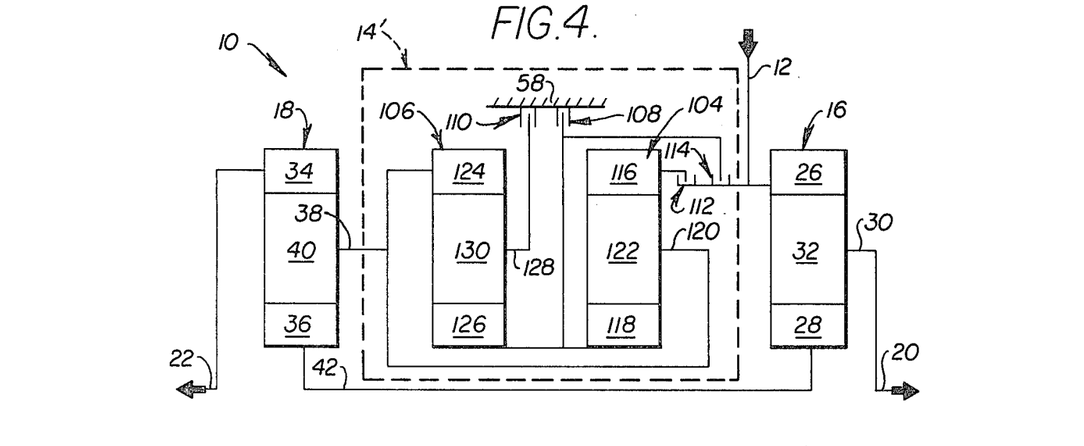
FIG. 4 is a schematic representation of another embodiment of the subject differential which provides four speeds.

A multi-speed unit 14' is illustrated diagrammatically in FIG. 4, which is a variation of the multi-speed unit 14 shown in FIGS. 1-3. Those elements common to FIGS. 1-3 are identified by similar reference numbers. Multi-speed unit 14' differs by having third and fourth planetary sets 104 and 106, first and second brake assemblies 108 and 110, and first and second rotating clutch assemblies 112 and 114. This enables three separate speed reductions and a direct drive to be obtained. The third planetary set 104 includes ring, sun and carrier elements 116, 118 and 120 and a plurality of planet gears 122 intermeshingly connected to the ring and sun elements, and the fourth planetary set 106 includes ring, sun and carrier elements 124, 126 and 128 and a plurality of planet elements 130. The sun elements 118,126 of the third and fourth planetary sets are connected together for joint rotation, and the carrier element 120 of the third planetary set is connected to the ring element 124 of the fourth planetary set and also to the carrier element 38 of the second planetary set for joint rotation.

Figure 5:
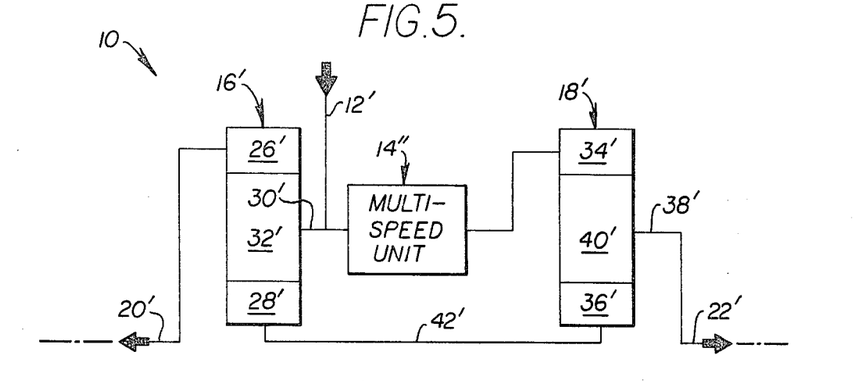
FIG. 5 is a generalized schematic representation of a still another embodiment of the subject differential which provides a lesser reduction than the embodiment illustrated in FIG. 2.

In FIG. 5, another basic embodiment of the multi-speed planetary differential 10 is illustrated wherein the input member 12' has a different relationship to the first and second planetary sets 16' and 18' when compared with FIG. 2. Elements similar to FIGS. 1-4 are identified with the same reference character with one or two prime indicators thereon. In this example the input member 12' is connected to the carrier element 30' of the first planetary set 16' and to the multi-speed unit 14''. The output of the multi-speed unit is connected to the ring element 34' of the second planetary set 18'. This provides a reduction somewhat less than that of FIG. 2.

Figure 6:
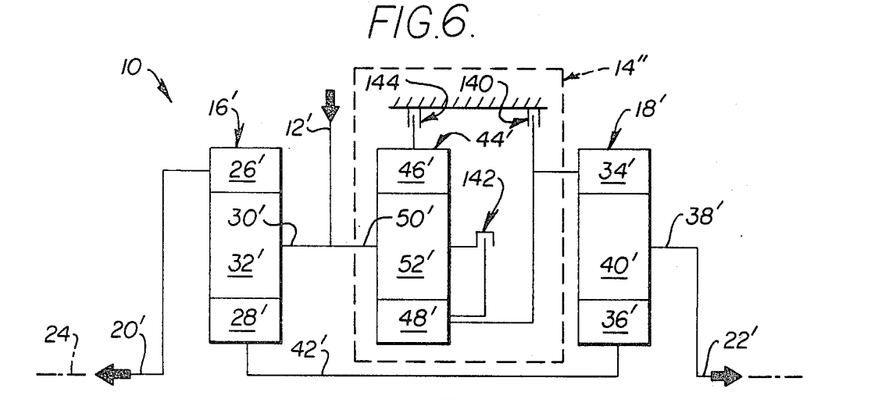
FIG. 6 is a more precise schematic representation of the planetary differential illustrated in FIG. 5.

A specific example of the generalized FIG. 5 construction is illustrated in FIG. 6. Here the multi-speed unit 14'' includes a third planetary set 44' having ring, sun and carrier elements 46', 48' and 50' and plurality of planet elements 52'. Input is by way of the jointly connected carrier elements 30' and 50'. The sun element 48' is connected to the ring element 34' of the second planetary set, and a brake assembly 140 is associated therewith to provide a low speed. A rotating clutch assembly 142 is provided to connect the carrier element 50' and the sun element 48' together for joint rotation to effect an intermediate speed mode of operation. Lastly, a brake assembly 144 is provided to hold the ring element 46' stationary to effect an overdrive or a high speed mode of operation.

Figure 7:
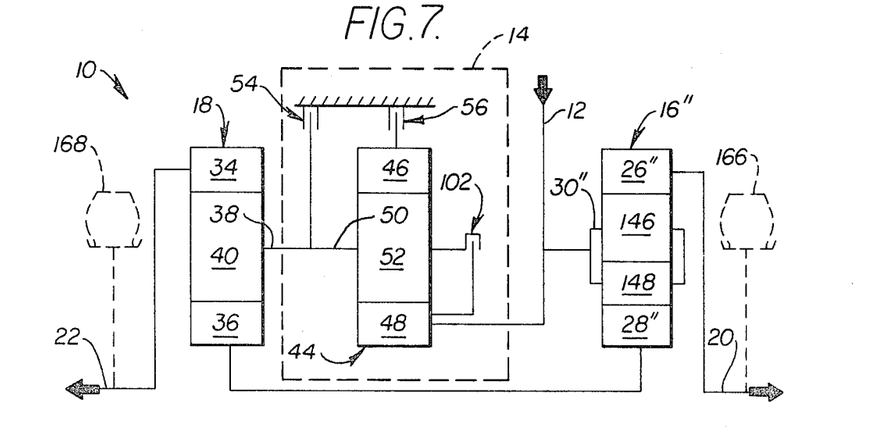
FIG. 7 is a schematic diagram of a still further embodiment of the subject differential showing a first planetary set with first and second pluralities of planet elements and a pair of wheels in broken lines connected to rotate with the opposite ring elements thereof.

An increased differential reduction is achieved in the example illustrated in FIG. 7, and while the planetary differential 10 bears a close resemblance to the construction of FIG. 3 it differs by utilizing a compound first planetary set 16'' having ring, sun and carrier elements 26'', 28'' and 30'' and first and second pluralities of intermeshing planet elements 146 and 148. The output to a pair of oppositely disposed vehicle wheels 166,168 as is diagrammatically illustrated in broken lines is more symmetrical at the opposite ends of the differential as by way of the opposite ring elements 26'', 34 and the output members 20,22. This is advantageous from an assembly or servicing standpoint.

Figure 8:
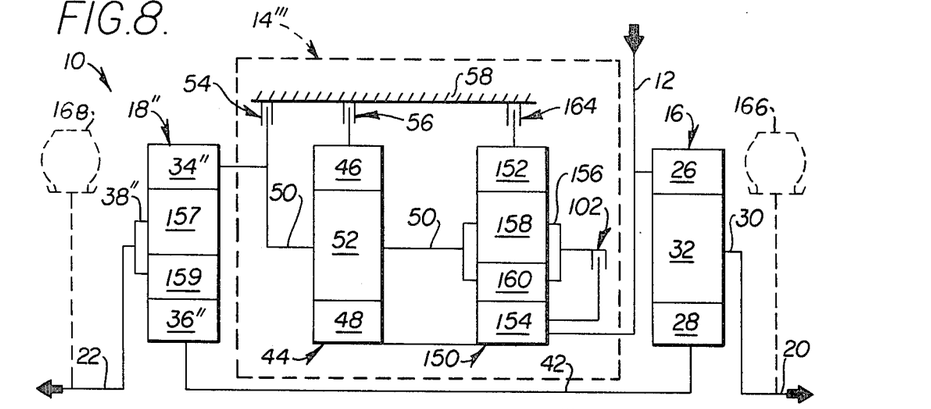
FIG. 8 is a still further schematic diagram of a differential constructed in accordance with the present invention and providing three speeds forward and one speed reverse and a pair of wheels in broken lines connected to rotate with the opposite carrier elements thereof.

I also contemplate that the multi-speed unit 14 can be modified to provide a reverse mode of operation of the planetary differential. FIG. 8 shows a three speed forward planetary differential with an added reverse speed. The multi-speed unit 14''' thereof advantageously includes a compound fourth planetary set 150 having ring, sun and carrier elements 152,154 and 156 and first and second pluralities of intermeshing planet elements 158 and 160. The carrier elements 50 and 156 of the third and fourth planetary sets 44 and 150 are connected together for joint rotation, the sun elements 48 and 154 are connected together for joint rotation, the brake assemblies 54 and 56 provide low and intermediate speed reductions respectively, and the rotating clutch assembly 102 provides high speed. In this instance reverse is achieved by the engagement of another brake assembly 164 that can selectively connect the ring element 152 to the cross drive housing 58.

Another feature of the FIG. 8 construction is that the second planetary set 18'' is also a compound set having first and second pluralities of intermeshing planet elements 157 and 159. The ring element 34'' thereof is connected for joint rotation with the common carrier elements 50 and 156 of the third and fourth planetary sets, and is stopped to provide a reaction when the brake assembly 54 is actuated. Advantageously, the carrier element 38 of the second planetary set rotates with the output member 22 in a manner symmetrical with the carrier element 30 of the first planetary set 16 which rotates with the output member 20. The vehicle wheels 166,168 can be compactly connected to the respective carrier element 30,38 for joint rotation. This can be desirable from an assembly or common serviceability standpoint.

Figure 9:
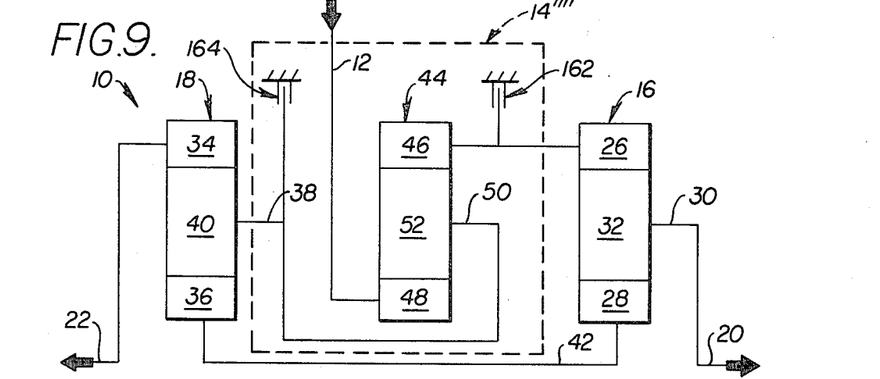
FIG. 9 is a still further schematic representation of another embodiment of the subject differential and illustrating a single forward and a single reverse speed capability.

I further contemplate a forward and reverse planetary differential 10 of the type illustrated in FIG. 9. While such construction does not have a plurality of speeds in a single direction, it does have two separate modes of operation. It can be appreciated from this illustration that the phrase "providing multi-speed capability" as defined herein can include a differential capable of driving the opposite output members 20,22 in the same rotational direction in at least two forward speeds or at least one speed forward and one speed reverse. The sun elements 28,36 of the first and second planetary sets 16,18 are connected for joint rotation, the ring elements 26,46 of the first and third planetary sets 16,44 are connected together for joint rotation, and the carrier elements 38,50 of the second and third planetary sets are connected together for joint rotation. Advantageously, first and second brake assemblies 162 and 164 alternately provide the forward and reverse modes of operation respectively. When actuated the first brake assembly 162 stops rotation of the ring elements 26,46 and provides a reaction thereby, whereas when actuated the second brake assembly 164 stops rotation of the carrier elements 38,50 and provides a separate reaction thereby.

Figure 10:
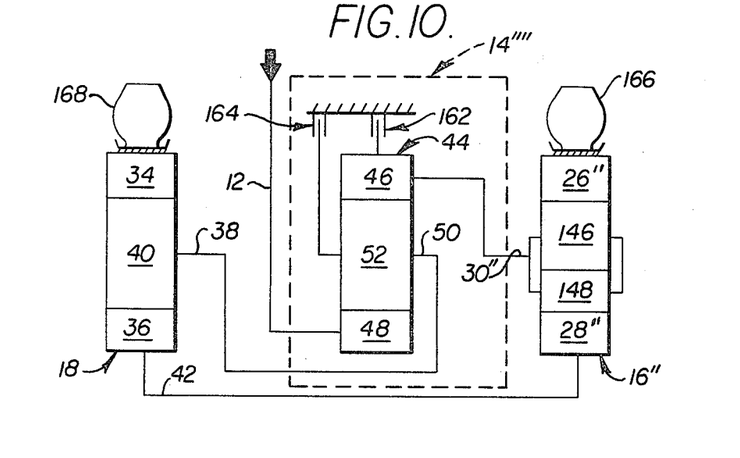
FIG. 10 is another, further schematic representation of a differential constructed in accordance with the present invention, and illustrating the compact nesting of the first and second planetary sets thereof within the wheels of the associated vehicle.

FIG. 10 illustrates a variation of the FIG. 9 construction that offers compactness in a wheel tired vehicle. The second and third planetary sets 18,44 are similar to FIG. 9, but the first planet set 16'' has first and second pluralities of planet elements 146,148 in much the same way as set forth above in connection with FIG. 7. The carrier element 30'' of the first planet set is connected to the ring element 46 for joint rotation, and stopping of the ring element 46 by actuation of the first brake assembly 162 provides forward rotation of the opposite wheels or tires 166 and 168 secured to rotate with the opposite ring elements 26'' and 34 respectively. Stopping of the carrier element 50 and carrier element 38 as a unit by actuation of the second brake assembly 164 provides reverse drive. In this example each of the tires 166,168 circumscribes or closely encircles one of the ring elements 26",34 to provide a particularly compact and substantially direct and transversely centered interconnection.

INDUSTRIAL APPLICABILITY

The multi-speed planetary differential 10 is expected to find its greatest utility in a fork lift truck, automobile, or the like, wherein the single input member 12 is powered by an engine and, if needed, via an intermediate transmission. Advantageously, substantially equal torque is delivered at all times to the opposite drive wheels of the vehicle by virtue of a preselected relationship between the first and second planetary sets 16,18. Such equal torque division provides directional stability when driving, and yet the differential function permits the wheels 166,168 to be operated at different rotational speeds in the same direction for vehicle turning or for wheel slippage under adverse traction conditions.

True differential action is obtained in the multi-speed planetary differential 10 by establishing the number of teeth in the rotating elements of the first and second planetary sets 16, 18 at preselected values. More specifically, this is accomplished for simple planetary systems wherein the stated planetary sets have only a single plurality of planetary gears by selecting the ratio of the number of teeth of the ring element divided by the number of teeth of the sun element, hereinafter called the e value, such that the e value for the first planetary set 16 is equal to the e value for the second planetary set 18 minus one. For example, in the construction of FIGS. 1 and 3, the number of teeth in the first planetary set ring and sun elements 26,28 respectively can be 72 and 36, which results in an e value of 2. The number of teeth in the second planetary set ring and sun elements 34 and 36 can be 72 and 24, which results in an e value of 3. With these relationships, assume that the carrier element 38 of the second planetary set of FIG. 3 is held stationary and that the ring element 26 of the first planetary set is driven at a preselected speed. Then, under these conditions, the carrier element 30 of the first planetary set and the ring element 34 of the second planetary set will rotate at one-third of that preselected speed and in the same rotational direction as the input when viewing along the axis 24.

Thus, it can be appreciated that in operation of the FIGS. 1 and 3 embodiment, the actuation or engagement of the first brake assembly 54 will stop rotation of carrier element 50 and integrally associated carrier element 38 to achieve a gear reduction level of 3. That is, the output members 20,22 will rotate at one third the speed of the input member 12 and in the same rotational direction, and the torque level at each of the output members will be 1½ times the input torque level.

The engagement of the second brake assembly 56 will stop rotation of the ring element 46 to give a preselected reduction level. In the instant example, the number of teeth of the ring and sun elements 46,48 of the third planetary set 44 are 72 and 36 respectively, to give an e value of 2. With such relationships the torque level at each of the output members 20,22 will be about 0.9 times the input torque level, or in other words a reduction level of 1.8 is obtained.

Lastly, the engagement of rotating clutch assembly 102 in FIG. 3 will couple the carrier and sun elements 50 and 48 for joint rotation such that if the input member 12 is rotated at a preselected speed, then the output members 20,22 will be driven at the same preselected speed for a speed reduction level of one. Also, the output members will furnish one-half of the input torque level to the wheels.

Turning next to the embodiment illustrated in FIG. 4, low or first speed is obtained by simultaneous engagement of brake assemblies 108 and 110. This can give a reduction level of 3. Second speed is obtained by simultaneous engagement of brake assembly 110 and rotating clutch assembly 112. This can give a reduction level of 1.667. Third speed is obtained by simultaneous engagement of brake assembly 108 and rotating clutch assembly 112 to give a reduction level of 1.286. And, with simultaneous engagement of rotating clutch assemblies 112 and 114, fourth speed is obtained with the planetary elements rotating as a unit to provide a speed reduction level of one. This advantageously provides fairly close step ratios at the upper speed end of the operating range.

In FIG. 6, the multi-speed unit 14" provides low, intermediate and high speeds by the individual engagement of brake assembly 140, rotating clutch assembly 142 and brake assembly 144 respectively. In such example, the respective reductions are 1.5, 1.0 and 0.6. Thus, the high speed mode of operation is not a true reduction, but an overdrive.

In FIG. 7 the operation is like the FIG. 3 embodiment, with the engagement of brake assembly 54 providing first speed and a reduction of 3.6. The actuation of brake assembly 56 gives a reduction of 1.93 for second speed. And the engagement of rotating clutch assembly 102 provides a speed reduction level of one or unity for third gear. The first planetary set 16" in this instance has what I define as a negative e value because of the dual planetary elements 146 and 148. When one of the planetary sets 16,18 is of such compound or dual planetary construction, and the other one is of simple construction, true differential action can usually be obtained by establishing the e values for both sets at the same absolute value.

FIG. 8 can provide first, second and third speeds by the individual engagement of brake assembly 54, which stops rotation of ring element 34" and carrier element 50, brake assembly 56 which stops rotation of ring element 46, and rotating clutch assembly 102 which links the sun and carrier elements 154,156 together for joint rotation. Reverse is obtained by the actuation of the brake assembly 164 to stop the rotation of the ring element 152 of the planetary set 150 which has dual planetary elements 158,160. Reduction levels of 3.0, 1.8 and 1.0 can be obtained in the three forward speeds, and a reduction level of 3.0 can be obtained in reverse. In this example the respective e values for the various planetary sets are $-4$, $+2$, $-2$ and $+2$ reading from left to right when viewing FIG. 8.

In FIG. 9, if the e values of the first, second and third planetary sets 16,18 and 44 are 2.0, 3.0 and 1.8 respectively, then the ratio of forward to reverse speed is about 1.286:1. In forward speed, corresponding to the engagement of brake assembly 162, one unit of torque delivered to the input member 12 can provide about 2.1 units of torque in the same rotational direction as the input member to each of the output members 20,22, and one unit of speed delivered to the input member 12 can result in a speed reduction at the output members 20,22 to about 0.24 units of such speed. In reverse, corresponding to engagement of brake assembly 164, the torque level at the output members 20,22 can be about 2.7 times that of the input member 12, and the speed reduction can be about 0.185.

In operation, the FIG. 10 differential can be constructed to be like that of FIG. 9 insofar as the speed reduction levels and torque multiplication factors are concerned. For example, e values of −3.0, 3.0 and 1.8 for the planetary sets 16", 18 and 44 respectively can provide the same torque magnification values of 2.1 and 2.7 in forward and reverse respectively.

Thus, it may be appreciated that the multi-speed planetary differential 10 of the present invention is compact and economical in construction, and the alignment of the principle elements thereof along a single transverse axis contributes to a relatively simple housing and rotary bearing system to support the elements. A true differential action is always available while propelling the vehicle in a plurality of speeds, and this is particularly advantageous in the cross drive of a vehicle having separate steering wheels. For example, the multi-speed planetary differential 10 is extremely useful for the rear driving portion of a lift truck, automobile or the like having steerable wheels on the front portion thereof.

Other aspects, objects and advantages of this invention can be obtained from a study of the drawings, the disclosure and the appended claims.

What is claimed is:

1. In a planetary differential (10) having first and second planetary sets (16,18) individually having ring, sun and carrier elements (26,28,30,34,36,38), first and second output members (20,22) individually connected to one of said ring and carrier elements (26,30,34,38) of the first and second planetary sets (16,18), and a rotary input member (12), the improvement comprising:

the sun elements (28,36) of the first and second planetary sets (16,18) being connected together for joint rotation; and means (14') for driving said output members (20,22) at substantially equal levels of torque in a plurality of reduced speeds, said means (14') being driven by said rotary input member (12) and driving the remaining one of said ring and carrier elements (34,38) of the second planetary set (18) in at least one of the plurality of speeds, the remaining one of said ring and carrier elements (26,30) of the first planetary set (16) being driven by one of said input member (12) and said means (14'), said means (14') including a third planetary set (44) having ring, sun and carrier elements (46,48,50), said input member (12) being connected to said sun element (48) of the third planetary set (44) for joint rotation, said means (14) including clutch means (102) for connecting said sun element (48) and said carrier element (50) of the third planetary set (44) for joint rotation.

2. In a planetary differential (10) having first and second planetary sets (16,18) arranged on a common axis (24) and individually having ring, sun and carrier elements (26,28,30,34,36,38), first and second output members (20,22) individually connected to one of said ring and carrier elements (26,30,34,38) of the first and second planetary sets (16,18), and a rotary input member (12), the improvement comprising:

the sun elements (28,36) of the first and second planetary sets (16,18) being connected together for joint rotation; and means (14) for driving said output members (20,22) at substantially equal levels of torque in a plurality of reduced speeds while maintaining true differential action, said means (14) being driven by said rotary input member (12) and driving the remaining one of said ring and carrier elements (34,38) of the second planetary set (18) in at least one of the plurality of speeds, the remaining one of said ring and carrier elements (26,30) of the first planetary set (16) being driven by one of said input member (12) and said means (14), said means (14) being located between the first and second planetary sets (16,18) on the common axis (24).

3. The planetary differential (10) of claim 2 wherein said means (14) includes a third planetary set (44) having ring, sun and carrier elements (46,48,50).

4. The planetary differential (10) of claim 3 wherein said input member (12) is connected to said sun element (48) of the third planetary set (44) for joint rotation.

5. The planetary differential (10) of claim 4 wherein said means (14) includes brake means (56) for stopping rotation of said ring element (46) of the third planetary set (44).

6. The planetary differential (10) of claim 5 wherein said means (14) includes brake means (54) for stopping rotation of said carrier element (50) of the third planetary set (44).

7. The planetary differential (10) of claim 2 wherein said input member (12) is connected to said ring element (26) of the first planetary set (16).

8. The planetary differential (10) of claim 7 wherein said means (14) includes a third planetary set (44) having ring, sun and carrier elements (46,48,50).

9. The planetary differential (10) of claim 2 wherein said input member (12') is connected to said carrier element (30') of the first planetary set (16').

10. The planetary differential (10) of claim 9 wherein said means (14") is connected to said ring element (34') of the second planetary set (18').

11. The planetary differential (10) of claim 10 wherein said means (14") includes a third planetary set (44') having ring, sun and carrier elements (46', 48', 50').

12. The planetary differential (10) of claim 11 wherein said input member (12') is connected to said carrier element (50') of the third planetary set (44') for joint rotation.

13. The planetary differential (10) of claim 12 wherein said means (14") includes clutch means (142) for connecting said carrier element (50') and sun element (48') of the third planetary set (44') together for joint rotation.

14. The planetary differential (10) of claim 13 wherein said means (14") includes brake means (144) for stopping rotation of said ring element (46') of the third planetary set (44').

15. The planetary differential (10) of claim 12 wherein said means (14") includes brake means (140) for stopping rotation of said sun element (48') of the third planetary set (44').

16. The planetary differential (10) of claim 12 wherein said means (14") includes brake means (144) for stopping rotation of said ring element (46') of the third planetary set (44').

17. The planetary differential (10) of claim 2 wherein said means (14) includes a third planetary set (44) having ring, sun and carrier elements (46,48,50), said carrier elements (38,50) of the second and third planetary sets (18,44) being connected together for joint rotation.

18. The planetary differential (10) of claim 17 including brake means (54) for stopping rotation of said carrier elements (38,50) of the second and third planetary sets (18,44).

19. The planetary differential (10) of claim 18 including brake means (56) for stopping rotation of said ring element (46) of the third planetary set (44).

20. The planetary differential (10) of claim 2 wherein said means (14') includes third and fourth planetary sets (104,106) individually having ring, sun and carrier elements (116,118,120,124,126,128).

21. The planetary differential (10) of claim 20 wherein said sun elements (118,126) of the third and fourth planetary sets (104,106) are connected together for joint rotation.

22. The planetary differential (10) of claim 21 wherein said means (14') includes brake means (110) for stopping rotation of said carrier element (128) of the fourth planetary set (106).

23. The planetary differential (10) of claim 2 wherein said first planetary set (16") has first and second pluralities of planet elements (146,148), and said input member (12) is connected to said carrier element (30") of the first planetary set (16").

24. The planetary differential (10) of claim 23 wherein said ring elements (26",34) of the first and second planetary sets (16",18) are connected to said first and second output members (20,22) respectively.

25. The planetary differential (10) of claim 2 wherein said means (14''') includes gear means (150,164) for providing a reverse mode of operation of said first and second output members (20,22).

26. The planetary differential (10) of claim 25 wherein said gear means (150,164) includes another planetary set (150) having ring, sun and carrier elements (152,154,156) and first and second pluralities of intermeshing planet elements (158,160).

27. The planetary differential of claim 26 wherein said gear means (150,164) includes brake means (164) for stopping rotation of said ring element (152) of said another planetary set (150).

28. The planetary differential (10) of claim 2 wherein the remaining one of said ring and carrier elements (26,30) of the first planetary set (16) is driven by said input member (12), and said means (14) drives said carrier element (38) of the second planetary set (18) in one of the plurality of speeds.

29. The planetary differential (10) of claim 2 wherein said means (14'''') is connected to drive said remaining one of said ring and carrier elements (26,30) of the first planetary set (16).

30. The planetary differential (10) of claim 29 wherein said means (14'''') includes a third planetary set (44) having ring, sun and carrier elements (46,48,50).

31. The planetary differential (10) of claim 29 wherein said means (14'''') includes a pair of brake assemblies (162,164) of a construction sufficient for individually providing forward and reverse modes of operation of the output members (20,22).

32. The planetary differential (10) of claim 30 wherein said ring elements (26,46) of said first and third planetary sets (16,44) are connected together for joint rotation.

33. The planetary differential (10) of claim 30 wherein one of said brake assemblies (162) is of a construction sufficient for stopping rotation of said ring element (26) of the first planetary set (16), and the other one of said brake assemblies (164) is of a construction sufficient for stopping rotation of said carrier element (38) of the second planetary set (18).

34. The planetary differential (10) of claim 2 including a pair of wheels (166,168) connected for joint rotation with said ring elements (26,34) of the first and second planetary sets (16",18) respectively.

35. The planetary differential (10) of claim 34 wherein said first planetary set (16") has first and second pluralities of intermeshing planets (146,148).

36. In a planetary differential (10) having first and second planetary sets (16,18) individually having ring, sun and carrier elements (26,28,30,34,36,38), first and second output members (20,22) individually connected to one of said ring and carrier elements (26,30,34,38) of the first and second planetary sets (16,18), and a rotary input member (12), the improvement comprising:
the sun elements (28,36) of the first and second planetary sets (16,18) being connected together for joint rotation; and
means (14') for driving said output members (20,22) at substantially equal levels of torque in a plurality of reduced speeds, said means (14') being driven by said rotary input member (12) and driving the remaining one of said ring and carrier elements (34,38) of the second planetary set (18) in at least one of the plurality of speeds, the remaining one of said ring and carrier elements (26,30) of the first planetary set (16) being driven by one of said input member (12) and said means (14'), said means (14') including third and fourth planetary sets (104,106) individually having ring, sun and carrier elements (116,118,120,124,126,128), said sun elements (118,126) of the third and fourth planetary sets (104,106) being connected together for joint rotation, said means (14') further including clutch means (114) for selectively coupling said sun elements (118,126) of the third and fourth planetary sets (104,106) to said ring element (26) of the first planetary set (16) for joint rotation.

37. In a planetary differential (10) having first and second planetary sets (16,18) individually having ring, sun and carrier elements (26,28,30,34,36,38), first and second output members (20,22) individually connected to one of said ring and carrier elements (26,30,34,38) of the first and second planetary sets (16,18), and a rotary input member (12), the improvement comprising:
the sun elements (28,36) of the first and second planetary sets (16,18) being connected together for joint rotation; and
means (14') for driving said output members (20,22) at substantially equal levels of torque in a plurality of reduced speeds, said means (14') being driven by said rotary input member (12) and driving the remaining one of said ring and carrier elements (34,38) of the second planetary set (18) in at least one of the plurality of speeds, the remaining one of said ring and carrier elements (26,30) of the first planetary set (16) being driven by one of said input member (12) and said means (14'), said means (14') including third and fourth planetary sets (104,106) individually having ring, sun and carrier elements (116,118,120,124,126,128), said sun elements (118,126) of the third and fourth planetary sets (104,106) being connected together for joint rotation, said means (14') further including clutch means (112) for selectively coupling said ring element (116) of the third planetary set (104) to said ring element (26) of the first planetary set (16).

38. In a planetary differential (10) having first and second planetary sets (16,18) individually having ring, sun and carrier elements (26,28,30,34,36,38), first and second output members (20,22) individually connected to one of said ring and carrier elements (26,30,34,38) of the first and second planetary sets (16,18), and a rotary input member (12), the improvement comprising:

the sun elements (28,36) of the first and second planetary sets (16,18) being connected together for joint rotation; and means (14') for driving said output members (20,22) at substantially equal levels of torque in a plurality of reduced speeds, said means (14') being driven by said rotary input member (12) and driving the remaining one of said ring and carrier elements (34,38) of the second planetary set (18) in at least one of the plurality of speeds, the remaining one of said ring and carrier elements (26,30) of the first planetary set (16) being driven by one of said input member (12) and said means (14'), said means (14') including third and fourth planetary sets (104,106) individually having ring, sun and carrier elements (116,118,120,124,126,128), said sun elements (118,126) of the third and fourth planetary sets (104,106) being connected together for joint rotation, said means (14') further including brake means (108) for stopping rotation of said sun elements (118,126) of the third and fourth planetary sets (104,106).

39. A multi-speed planetary differential (10) for receiving input at an input gear (12), and delivering output to first and second output members (20,22) on a common axis (24), comprising:

a first planetary set (16) having ring, sun and carrier elements (26,28,30), one of said ring and carrier elements (26,30) being connected to said first output member (20);

a second planetary set (18) having ring, sun and carrier elements (34,36,38), one of said ring and carrier elements (34,38) of the second planetary set being connected to said second output member (22), the sun element (28) of the first planetary set (16) being connected to rotate jointly with the sun element (36) of the second planetary set (28), the input gear (12) being continuously connected for joint rotation with the remaining one of said ring and carrier elements (26,30) of the first planetary set; and means (14) for driving said output members (20,22) at equal levels of torque and at least two different reduced speeds while maintaining true differential action, said means (14) being connected to said input gear (12) and driving said remaining one of said ring and carrier elements (34,38) of the second planetary set in at least one of said speeds, said means (14) being located between the first and second planetary sets (16,18) on the common axis (24).

40. The multi-speed planetary differential (10) of claim 39 wherein said means (14) includes a third planetary set (44) having ring, sun and carrier elements (46,48,50).

41. The multi-speed planetary differential (10) of claim 40 wherein said means (14) includes brake means (54) for stopping rotation of said carrier element (38) of said second planetary set (18), and said carrier element (38) of said second planetary set (18) is connected for joint rotation with said carrier element (50) of said third planetary set (44).

42. The multi-speed planetary differential (10) of claim 40 wherein said means (14) includes brake means (56) for stopping rotation of said ring element (46) of said third planetary set (44).

43. A multi-speed planetary differential (10) for receiving input from a driven gear (86) and delivering substantially equal torque output to first and second output members (20,22), comprising:

a first planetary set (16) having ring, sun and carrier elements (26,28,30), a preselected first one of said ring and carrier elements (26,30) being connected to said first output member (20);

a second planetary set (18) having ring, sun, and carrier elements (34,36,38), a preselected first one of said ring and carrier elements (34,38) of the second planetary set being connected to said second output member (22), said sun elements (28,36) of the first and second planetary sets (16,18) being connected for joint rotation; and a third planetary set (44) having ring, sun, and carrier elements (46,48,50), located between the first and second planetary sets (16,18) on a common axis (24) therewith, said sun element (48) of the third planetary set (44) and the remaining one of said ring and carrier elements (26,30) of the first planetary set (16) being connected together for joint rotation and being driven by said driven gear (86), said carrier element (50) of the third planetary set (44) being connected to rotate with and driving the remaining one of said ring and carrier elements (34,38) of the second planetary set (18) in one speed, true differential action being maintained by establishing the e values of the first and second planetary sets (16,18) at a preselected different relationship.

44. The multi-speed planetary differential (10) of claim 43 including brake means (56) for stopping rotation of said ring element (46) of the third planetary set (44).

45. The multi-speed planetary differential (10) of claim 43 including brake means (54) for stopping rotation of said carrier element (50) of the third planetary set (44).

46. The multi-speed planetary differential (10) of claim 43 including rotating clutch means (102) for coupling for joint rotation said sun and carrier elements (48,50) of the third planetary set (44).

47. The multi-speed planetary differential (10) of claim 43 including a pair of wheels (166,168) individually connected for joint rotation with said output members (20,22).

48. The multi-speed planetary differential (10) of claim 43 wherein said ring elements (26", 34) of the first and second planetary sets (16",18) are individually connected for joint rotation with said output members (20,22).

49. A multi-speed planetary differential (10) for receiving input from a driven gear (86) and delivering substantially equal torque to opposite first and second wheels (166,168), comprising:

a first planetary set (16") having ring, sun and carrier elements (26",28",30"), the ring element (26") being connected to rotate with said first wheel (166);

a second planetary set (18) having ring, sun and carrier elements (34,36,38), the ring element (34) of the second planetary set being connected to rotate with said second wheel (168), the sun elements (28",36) of the first and second planetary sets (16",18) being connected together for joint rotation; and means (14,14'''') for providing true differential and reduced multi-speed capability of said ring elements (26",34) of the first and second planetary sets (16",18), said means (14,14"") being connected to said driven gear (86) and to the carrier elements (30",38) of both said first and second planetary set (16",18) and being disposed on a common axis (24) therewith.

50. The multi-speed planetary differential (10) of claim 49 wherein said means (14,14"") includes a third planetary set (44) having ring, sun and carrier elements (46,48,50).

51. The multi-speed planetary differential (10) of claim 50 wherein said driven gear (86) is connected to drive said sun element (48) of the third planetary set (44).

52. The multi-speed planetary differential (10) of claim 51 wherein said means (14,14"") includes brake means (56,54,162,164) for selectively stopping rotation of said ring and said carrier elements (46,50) of the third planetary set (44).

53. The multi-speed planetary differential (10) of claim 49 wherein each of said wheels (166,168) is a tire closely encircling a respective one of said ring elements (26",34).

54. The multi-speed planetary differential (10) of claim 49 wherein said first planetary set (16") has first and second pluralities of planet elements (146,148) and said second planetary set (18) has a single plurality of planet elements (40).

55. A multi-speed planetary differential (10) for receiving input from a driven gear (86) and delivering equal torque to opposite first and second wheels (166,168), comprising:

a first planetary set (16) having ring, sun and carrier elements (26,28,30) and a single plurality of planetary elements (32), the carrier element (30) being connected to rotate with said first wheel (166);

a second planetary set (18") having ring, sun and carrier elements (34",36",38") and first and second pluralities of planet elements (157,159), the carrier element (38") of the second planetary set (18") being connected to rotate with said second wheel (168), said sun elements (28,36") being connected for joint rotation; and means (14''') for providing true differential and reduced multi-speed capability of said carrier elements (30,38") of the first and second planetary sets (16,18"), said means (14''') being connected to said driven gear (86) and to the ring elements (26,34") of said first and second planetary sets (16,18") and being disposed on a common axis (24) therewith.

56. The multi-speed planetary differential (10) of claim 55 wherein said means (14''') includes a third planetary set (44) having ring, sun and carrier elements (46,48,40).

57. The multi-speed planetary differential (10) of claim 56 wherein said driven gear (86) is connected for joint rotation to said sun element (48) of the third planetary set (44).

58. The multi-speed planetary differential (10) of claim 57 wherein said means (14''') includes brake means (54,56) for selectively stopping rotation of said carrier and ring elements (50,46) of the third planetary set (44).

* * * * *